Dec. 15, 1959 A. JENNEY 2,917,143
INCHING VALVE CONTROL
Filed Oct. 13, 1958
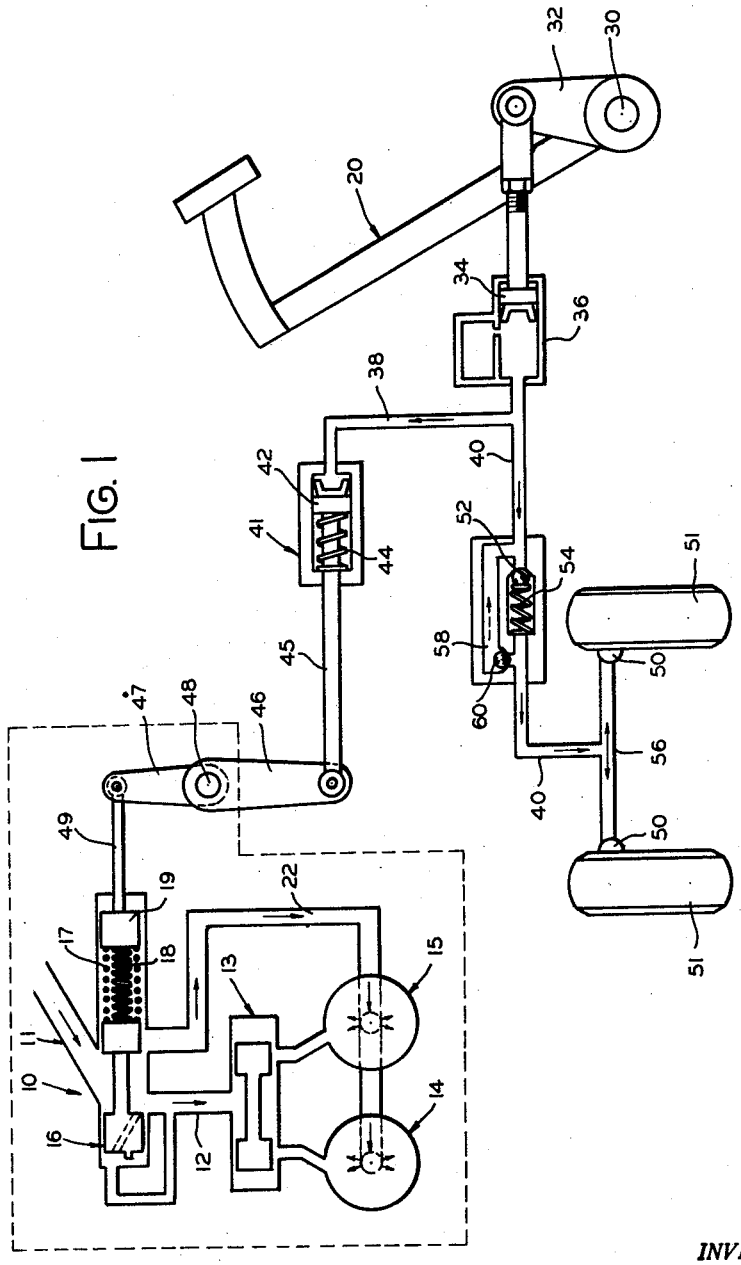
INVENTOR.
ASA JENNEY
BY J. P. Wiessler
ATTY.

United States Patent Office 2,917,143
Patented Dec. 15, 1959

2,917,143

INCHING VALVE CONTROL

Asa Jenney, Battle Creek, Mich., assignor to Clark Equipment Company, a corporation of Michigan Application October 13, 1958, Serial No. 766,916

12 Claims. (Cl. 192—13)

This invention relates generally to improvements in control means for valves used in fluid operated control systems. More particularly, the control means of this invention finds particular usefulness in controlling the operation of valves of the type known as "inching" valves which are normally disposed between a source of pressurized fluid and a device operated thereby, for example, a transmission clutch.

Inching valves find particular usefulness in the transmission controls of industrial trucks wherein it frequently becomes necessary to "inch" the truck forwardly or rearwardly as the load is being engaged and raised or lowered. A transmission control system which utilizes inching valve means is disclosed in Cook Patent No. 2,786,368, dated March 26, 1957, wherein such a valve is shown in connection with the fluid circuit of the vehicle brakes. It is therein disclosed in detail that when the brakes are actuated, fluid in the brake circuit acts on the inching valve to shift the latter to effect bleeding of the transmission clutch, thus rendering the latter inoperative. When the brake pedal is released, the inching valve is returned to its normal position re-establishing communication between a control valve and the source of fluid under pressure. As a result, drive between the input and output shafts of the transmission may be interrupted and re-established quickly and positively to permit inching of the vehicle without interferring with the operations of raising and lowering a load, which latter operation requires that the prime mover of the truck be operated.

The transmission control system of the Cook patent has performed in the past very satisfactorily, although in operation under certain conditions it was found that brake fluid could enter the transmission through the inching control, which was quite undesirable.

In Bolster et al. Patent No. 2,814,371, dated November 26, 1957, inching control valve mechanism is disclosed which is constructed to provide improved gradual engagement and disengagement of the clutch, after relief of excess pressure in the system, by operating the valve in conjunction with the application and release of the vehicle's brake system. The control valve of the Bolster et al. patent may be characterized generally as a spool type having a suitable porting system and novel opposing spring means therein, so as to provide an accurate, but rugged valve means capable of relieving over-pressures to gain a workable pressure which is thereafter regulated to control the transmission clutches of the vehicle.

The control valve mechanism of the Bolster et al. patent has been found to be commercially satisfactory over a period of years. However, the mechanical connection which has been utilized between the brake pedal arm and the valve control mechanism requires certain critical adjustments which, in practice, must be made periodically and correctly in order that the control valve functions properly.

Although the aforementioned mechanical connection of Bolster et al. was superior to the corresponding hydraulic connection disclosed in the Cook patent, insofar as it eliminated the possibility of introducing brake fluid into the transmission, the necessity of making periodic adjustments of a critical nature in the mechanical linkage connection left something to be desired in the perfection of the inching valve control system of industrial lift trucks and like vehicles.

I have solved both of the problems discussed hereinabove which were encountered in the use of previous controls by providing a novel hydraulic control between the inching valve control means, the brake pedal means and the vehicle brakes. My control means eliminates the necessity for previous critical adjustments of prior mechanical inching valve controls as well as eliminating the possibility of the introduction of brake fluid into the transmission by providing a novel hydraulic inching valve control as aforesaid.

Briefly stated, the invention herein constitutes an improved control system which finds particular usefulness in connection with valve mechanisms of the type disclosed, for example, in the aforementioned Bolster et al. patent. It provides for a common hydraulic circuit between the master cylinder of the brake system, the wheel cylinders of the brakes, and an actuating means for the control valve, while providing means for insuring the proper sequence of operation of the control valve and the brakes.

It is the primary object of this invention to provide a new and improved control for inching valves.

Another object of the invention is to provide a new and improved inching valve control means for use in vehicles using a hydraulic transmission system to the end that the vehicular clutch mechanism may be gradually engaged or disengaged at the will of the operator by operating the vehicle's brake system.

Still another object of the invention is to provide a new and improved control for inching valves and brakes of industrial lift trucks and like vehicles which is operable solely by the manipulation of a foot pedal associated with the vehicle's brake system.

The above and further objects, features and advantages of this invention will be apparent to those familiar in the art from the following detailed description taken in conjunction with the drawing, wherein the single figure is a schematic representation of a typical hydraulic system in which the control of the present invention finds utility.

Referring now in detail to the drawing, wherein the inching valve and associated transmission mechanism is like that which is shown in the aforementioned Bolster et al. patent, the valve 10 is employed in a hydraulic transmission circuit of an industrial lift truck. Valve 10 serves to control the pressure of fluid supplied by inlet 11, from the hydraulic pump of the vehicle's transmission, to a conduit means 12 leading to a clutch direction selection means 13. Such means 13 controls the actuation of reverse and forward direction selectors 14 and 15, respectively, of the vehicle's clutch system. Valve 10 includes a valve piston or spool 16 which is actuated to the right, as viewed in the drawing, by fluid pressure at the left hand end thereof. Such movement of spool 16 serves to compress a spring system comprising compression springs 17 and 18 which extend between the right hand end of the spool 16 and a secondary piston 19, the latter of which is operated hydraulically in response to the actuation of a brake pedal of the vehicle as indicated generally at 20 and as will be described more fully hereinafter.

Without dwelling on the particulars of the inching valve itself, which can be readily obtained from the Bolster et al. patent, it is sufficient for present purposes to point out that the operation of the piston spool 16 in response to activity of the brake pedal serves first to diminish the clutch pressure of fluid supplied from the main supply conduit 11 to conduit 12 and direction selector 13 by opening a by-pass sump passageway 22 and thereafter to regulate the pressure of fluid supplied to the clutches 14 and 15 by conduit means 12. Essentially, this system is constructed so that initial depression of the brake pedal 20 serves to vent off the pressure of the supply fluid until a workable limit is reached which function is followed by a gradual de-activation or declutching of the fluid operated clutch associated with the vehicle.

Now as to the particulars of the control means of this invention, brake pedal means 20 is mounted for pivotal movement upon a transverse shaft 30 to which is connected an arm 32 which is pivotally connected at its upper end to an adjustable extension of the piston rod of a piston element 34 mounted for reciprocation in the master cylinder 36 of a hydraulic brake system for the vehicle. An opening in the one end of the master cylinder is connected to a pair of branch conduits 38 and 40. Conduit 38 is connected to the one end of an actuating piston and cylinder assembly 41 which includes a piston head 42 and a spring 44 urging the piston head towards one end of the cylinder. The piston rod 45 of piston head 42 is connected to the secondary piston 19 by means of a pair of links 46 and 47, which are mounted in spaced relation to each other for pivotal movement with a shaft member 48 which extends through the transmission case, and a rod 49 connecting the one end of link 47 to piston 19. As will be apparent spring 44 urges links 46 and 47 in counterclockwise direction, as shown, which, through springs 17 and 18, urges the inching valve element 16 leftwardly to its non-regulating position.

Conduit 40 connects the master cylinder 36 to a pair of wheel cylinders 50, associated in well-known manner with a pair of vehicle wheels 51, by way of check valve 52, which is urged towards closed position by a spring 54, and a conduit 56. A passageway 58 is connected to conduit 40 on opposite sides of check valve 52, and a floating type ball-check valve 60 is seated at the one end of passageway 58 for interrupting communication between said one end and that portion of conduit 40 downstream of valve 52.

The relationship between the spring rates of spring members 44 and 54 is such that piston 42 is adapted to be actuated under the influence of fluid pressure in conduit 38 to a position wherein spring member 44 is substantially fully compressed prior to said fluid pressure being effective to open check valve 52 against the force of spring member 54. For example, if the operator desires to inch the vehicle at practically zero speed he depresses brake pedal 20 sufficiently to move the piston 34 of the master cylinder a distance which will provide sufficient brake fluid pressure in conduit 38 to actuate piston 42 through its full stroke in cylinder 41, which causes links 46 and 47 to rotate clockwise about shaft 48 thereby causing inching valve element 16 to move rightwardly to a position of maximum pressure regulation, while check valves 52 and 60 remain seated to prohibit the flow of brake fluid to wheel cylinders 50.

It will be understood that as the inching valve element 16 moves rightwardly under the influence of its connection to piston 42, it gradually reduces hydraulic pressure in the transmission clutches 14 and 15, thereby permitting said clutches to increasingly slip and reduce the power to the drive wheels in a controlled manner. Thus, the operator is able to controllably inch the vehicle as conditions require. In other words, the operator has close incremential inching speed control of the vehicle simply by depressing brake pedal 20 to any desired position in its initial range of movement, which may be said to substantially terminate upon full compression of spring 44. During inching operations, the operator has full control in that he can depress or release the brake pedal 20 to any increment of movement desired within the said initial range thereof.

Now assuming that the operator desires to brake the vehicle, he depresses brake pedal 20 as before, but does not terminate its movement within the initial range thereof. Such continued pedal depression, of course, applies sufficient fluid pressure against check valve 52 to compress spring element 54, thereby opening valve 52 and introducing brake fluid into wheel cylinders 50. During such application of the brakes, check valve 60 remains seated due to the larger effective area thereof in passageway 58 as compared with conduit 40, thus disallowing loss of pressure fluid in the brake cylinders. Of course, as soon as fluid pressure increases on the brake cylinder side of check valve 52, the check valve reseats under the influence of spring 54.

When brake pedal 20 is released, piston 34 moves towards its initial position, as shown, thereby creating a pressure differential across check valve 60 in the opposite direction which causes the check valve to open permitting brake fluid to return to the master cylinder by way of passageway 58 and conduit 40. At the same time, spring 44 returns inching piston 42 to its initial position thereby returning the displaced fluid in cylinder 41 to the master cylinder.

The physical separation of the inching valve actuator 41, 42 from the inching valve assembly 10 insures against the possibility of brake system fluid entering the transmission. In addition, utilization of the dual check valves 52 and 60 in the above described manner assures full inching speed control from normal truck speeds to substantially zero inching speed as the pedal 20 is depressed through its initial range to cause full available movement of piston 42. Also, my control system assures a natural or expected sequence of events as brake pedal 20 is depressed from its up position; i.e., if the pedal is slowly depressed the truck will decrease its speed gradually through the inching operation until the brakes are applied upon the opening of check valve 52. On the other hand, whenever fast braking is necessary, pedal 20 may be quickly depressed in a normal manner beyond its said initial range of movement to instantaneously open check valve 52 and cause an immediate application of the brakes.

From the foregoing description it is believed that the concepts and features of my invention will be clearly understood by those familiar in the art. While the invention has been disclosed and described in association with a single and preferred embodiment thereof, it is obvious that changes may be made therein without departing from the spirit and scope of the invention. As a consequence, it is not my intention that I be limited to the particular form of the invention herein described and disclosed except as may appear in the claims appended.

I claim:

1. For use in a wheeled vehicle having a transmission with fluid activated clutch means, and a valve means for activating and de-activating the clutch means by operation of brake control means, the combination comprising, a master cylinder housing movable piston means, a hydraulic actuator connected to the valve means for actuating same to selectively activate and de-activate the clutch means, a first conduit connecting said actuator to the master cylinder, a second conduit connecting the master cylinder to braking elements at the wheels, a valving means in said second conduit, and means associated with said actuator and with said valving means for sequencing the operation thereof such that movement of the piston means in a direction to apply the braking elements first initates full effective movement of the actuator and then causes the valving means to open.

2. For use in a wheeled vehicle having a transmission with fluid activated clutch means, brake means for arresting movement of the vehicle including a master brake actuator and wheel cylinders, and a valve means for activating and de-activating the clutch means by operation of the brake means, the combination comprising, actuating means operatively connected to the valve means and to the master brake actuator, a valving means operatively connected to the wheel brakes and to the master brake actuator, means interconnecting the actuating means and the valving means, and means urging the actuating means and the valving means to normally fixed positions, said master actuator being movable in one direction to first impose a force on said actuating means which causes full effective movement thereof against the urging of said last named means, whereby to actuate the valve means for de-activating the clutch means, further movement of said master actuator in said one direction causing said valving means to open in opposition to said urging means whereby to permit the application of braking force at the wheels.

3. The combination as claimed in claim 2 wherein movement of the master actuator in the other direction functions to first remove the application of braking force at the wheels by means of a second valving means which is associated with the first named valving means for operation subsequent to the first named movement of the master actuator and concurrently with the second named movement of the master actuator.

4. The combination as claimed in claim 3 wherein said second valving means comprises a passageway which by-passes said first valving means and a check valve in said passageway which permits the flow therethrough of fluid only from the wheel cylinders to the master actuator.

5. A combination as claimed in claim 2 wherein said master actuator comprises a hydraulic master brake cylinder assembly, said actuating means is a hydraulic member movable under the influence of the master actuator, and said valving means is adapted to interrupt the flow of fluid from the master actuator to the wheel brakes, said urging means comprising resilient means resisting movements of the actuating means and valving means in such a manner that the actuating means is caused to move substantially fully against said urging means prior to effective movement of said valving means against said urging means.

6. For use in a wheeled vehicle having a transmission with fluid activated clutch means, a brake means for arresting movement of the vehicle, and valve means for activating and deactivating the clutch means by operation of the brake means, the combination comprising, an interdependent brake and valve control means which includes master brake cylinder means operatively connected to the valve means and to the vehicle wheels for braking same, said operative connection including a piston actuator connected to the valve means and responsive to operation of the master cylinder, and valving means interposed between the master cylinder and the wheels, said piston actuator and valving means being so constructed and arranged that operation of the master cylinder initially causes full effective operation of the piston actuator to move the valve means and de-activate the clutch means and then causes operation of the valving means to permit activation of the brake means in order to arrest movement of the vehicle.

7. A combination as claimed in claim 6 wherein first spring means opposes movement of the piston actuator by the master cylinder, and second spring means opposes operation of the valving means by the master cylinder, said first and second spring means being so related that the master cylinder substantially fully overcomes the effective opposition of the first spring means prior to overcoming initially the opposition of the second spring means.

8. A combination as claimed in claim 6 wherein the first range of movement of the master cylinder means causes proportional movement of the valve means by way of the piston actuator to controllably de-activate the clutch means for inching operation of the vehicle, and additional movement of the master cylinder operates the brake means by causing said valving means to open for permitting the application of braking force at the wheels.

9. A combination as claimed in claim 8 wherein full inching control of the vehicle is available during movement of the master cylinder means in either direction through the initial range of movement thereof.

10. A combination as claimed in claim 6 wherein second valving means is adapted to by-pass said first mentioned valving means upon movement of the master cylinder means towards initial non-operative position.

11. For use in a wheeled vehicle having a transmission with fluid activated clutch means, a brake means for arresting movement of the vehicle, said brake means including wheel cylinders and a foot pedal, and inching valve means for activating and deactivating the clutch means by operation of the brake means, the combination comprising, a hydraulic brake master cylinder assembly operated by the foot pedal, actuator piston means connected to the inching valve means and to the master cylinder, conduit means connecting the master cylinder to the actuator piston and to the wheel cylinders, check valve means interposed in the conduit means between the master cylinder and the wheel cylinders, first spring means urging said actuator piston and valve in a direction to activate the clutch means, and second spring means urging the check valve in a direction to interrupt the flow of fluid from the master cylinder to the wheel cylinders, movement of said foot pedal in one direction causing actuation of the master cylinder to initially actuate the actuator piston through its full effective range against the first spring means in order to actuate the inching valve in a direction which de-activates the clutch means, and to subsequently cause the check valve to open against the second spring means thereby permitting the flow of brake fluid to the wheel cylinders to arrest movement of the vehicle.

12. A combination as claimed in claim 11 plus a passageway by-passing said first check valve, and a second check valve which normally interrupts the flow of fluid through said passageway, said second check valve opening upon movement of the foot pedal in an opposite direction to permit the return of fluid from the wheel cylinders to the master cylinder through said passageway.

References Cited in the file of this patent

UNITED STATES PATENTS

| | | |
|---|---|---|
| 2,065,980 | Mayback | Dec. 29, 1936 |
| 2,141,689 | Eaton | Dec. 27, 1938 |
| 2,814,371 | Bolster et al. | Nov. 26, 1957 |